United States Patent [19]

Nussbaumer

[11] Patent Number: 4,569,075
[45] Date of Patent: Feb. 4, 1986

[54] METHOD OF CODING VOICE SIGNALS AND DEVICE USING SAID METHOD

[75] Inventor: Henri Nussbaumer, La Gaude, France

[73] Assignee: International Business Machines Corporation, Armonk, N.Y.

[21] Appl. No.: 399,385

[22] Filed: Jul. 19, 1982

[30] Foreign Application Priority Data

Jul. 28, 1981 [EP] European Pat. Off. ........ 81430023.2

[51] Int. Cl.[4] .................................................. G10L 1/00
[52] U.S. Cl. ......................................... 381/29; 381/34
[58] Field of Search .................. 381/29, 30, 31, 32, 381/33, 34, 35, 36, 37, 38, 39

[56] References Cited

U.S. PATENT DOCUMENTS

| | | | |
|---|---|---|---|
| 3,360,610 | 12/1967 | Flanagan ................................ | 381/37 |
| 3,484,556 | 12/1969 | Flanagan et al. ....................... | 381/37 |
| 4,142,071 | 2/1979 | Grosier et al. .......................... | 381/31 |
| 4,184,049 | 1/1980 | Crochiere et al. ...................... | 381/31 |
| 4,216,354 | 8/1980 | Esteban et al. ......................... | 381/31 |

Primary Examiner—E. S. Matt Kemeny
Attorney, Agent, or Firm—Edward H. Duffield

[57] ABSTRACT

The baseband portion x(t) of a voice signal is first applied to a complex filter which provides a couple of signal components y and $\hat{y}$ in quadrature with each other. Each of the components y and $\hat{y}$ is then fed to a bank of QMF filters which split the spectra of y and $\hat{y}$ into N subbands providing subband components $y_i$ and $\hat{y}_i$ (with i=1, 2, . . . , N), respectively. The subband components $y_i$ and $\hat{y}_i$ are combined together to generate information representative of the phase ($\phi_i$) and amplitude ($\rho_i$) of the contents of each subband, which information is then transcoded by a coder which dynamically distributes the available bit resources to the various subbands.

1 Claim, 12 Drawing Figures

METHOD OF CODING VOICE SIGNALS AND DEVICE USING SAID METHOD

DESCRIPTION

TECHNICAL FIELD

This invention relates to digital techniques for coding voice signals.

BACKGROUND ART

Many methods of coding voice signals are known which allow the number of bits required for coding said signals to be minimized while still affording sufficient precision to enable the decoded signal to faithfully reproduce the input signal. One such method is the subband coding scheme described in an article by D. Esteban and C. Galand entitled "32 kbps CCITT Compatible Split Band Coding" in Proceedings of the 1978 IEEE International Conference on Acoustics, Speech and Signal Processing, Tulsa, Okla., Apr. 10–12, 1978. Basically, this scheme consists in splitting the low-frequency band (telephone channel bandwidth) of the signal to be processed into several subbands and in optimally quantifying the information contained in each subband. Also, the output signal from each subband is re-sampled (by means of a so-called decimation operation) so as to cause the information rate to remain constant. Although this subband coding scheme yields very good results, still better results can be obtained by making use of the basic properties of voice signals and, in particular, of the characteristics of the so-called baseband.

SUMMARY OF THE INVENTION

It is an object of this invention to provide a subband coding method which is an improvement of the coding techniques that utilize specific properties of the baseband of the voice signal to be coded.

More specifically, the method of the present invention involves splitting the telephone bandwidth of the voice signal into N narrow subbands each of which provides two quadrature components of the signal; deriving from said components information representing the phase and the amplitude of the signal in each of said subbands; and coding said information.

The foregoing and other objects, features and advantages of the invention will be apparent from the following more particular description of a preferred embodiment of the invention, as illustrated in the accompanying drawings.

DETAILED DESCRIPTION OF THE INVENTION

Figure 1:
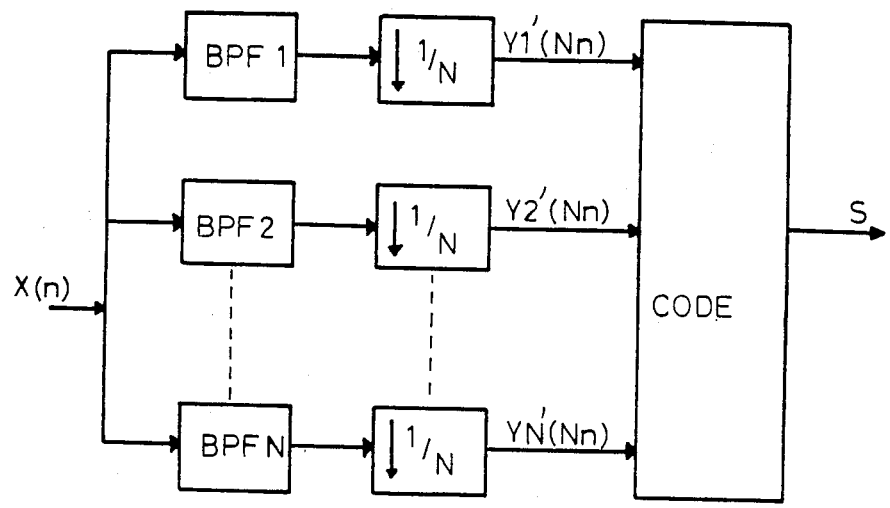
FIG. 1 shows a prior art subband coding device.

FIG. 1 shows the principles of the subband coding technique an embodiment of which is described in U.S. Pat. No. 4,142,071 to Croisier et al., entitled "Quantizing Process with Dynamic Allocation of the Available Bit Resources and Device for Implementing said Process", issued Feb. 27, 1979. Another embodiment is described in U.S. Pat. No. 4,216,354 to Esteban et al., entitled "Process for Compressing Data Relative to Voice Signals and Device Applying said Process", issued Aug. 5, 1980. For the purposes of the present invention, only that part of the latter patent which relates to the subband coding technique used for coding the low-frequency part (or baseband) of the voice signal need be considered. Concerning the principles underlying the subband coding technique, it should be noted that, as shown in FIG. 1, samples x(n) of a signal to be coded are passed through a bank of N bandpass filters BPF1–BPFN whose bandwidths are adjacent and extend at least partially over the low-frequency band (or baseband) in which lies the spectrum of the signal from which the samples x(n) are taken. The information rate at the output of the bank of filters, that is, the number of samples per unit of time for the subbands defined by the filters, is caused to remain identical to that at the input of the bank of filters by means of a so-called decimation operation. This consists in re-sampling the signal at the output of each subband by taking only one out of N samples thereof. The samples of the decimated subband signals, $y_1'(Nn)$ to $y_N'(Nn)$, are then quantized (or re-quantized, as the case may be) in the device labeled "CODE", which is described in detail in the aforementioned U.S. Patents, both of which are incorporated herein by reference. The filtering and quantizing (or re-quantizing) operations introduce distortions or noise. In practice, the voice signal in the baseband is either unpitched or pitched. In the former case, the average energy of the baseband signal is low, thereby minimizing the quantizing errors which merely add noise to noise. However, in the latter case, the baseband signal comprises the fundamental (or pitch) frequency and its harmonics. Consequently, if a suitable number N of subbands is selected (N=16 or 32, for example), it may be expected that, as far as pitched sounds are concerned, the subbands will only contain pure frequencies. The best possible use should therefore be made of these properties, particularly by utilizing a device embodying the schematic diagram of FIG. 2.

The samples x(n) of the signal in the baseband are fed to a bank of N bandpass filters BPF'1–BPF'N whose bandwidths are similar to those of filters BPF1–BPFN of FIG. 1, but each of which provides a couple of signal components in quadrature with each other, so that in-phase and quadrature components designated here $y_1(n)$–$y_N(n)$ and $\hat{y}_1(n)$–$\hat{y}_N(n)$, respectively, are obtained at the output of these filters. Thus, each bandpass filter supplies a couple of signal components ($Y_i$ and $\hat{Y}_i$) in quadrature with each other. A device labeled "($\rho, \phi$)" then derives from each of said couples a pair of signals comprised of a phase information signal ($\phi$) and an amplitude information ($\rho$) such that $$\rho_i(n) = \sqrt{y_i^2(n) + \hat{y}_i^2(n)} \text{ and } \phi_i(n) = \text{Arc tan} \frac{\hat{y}_i}{y_i}.$$

where i denotes the order of the subband involved, thus i=1,2,..., N. In other words, $\rho_i$ and $\phi_i$ are respectively the amplitude information signal and the phase information signal relating to the contents of the $i^{th}$ subband.

The signals $\rho_i(n)$ and $\phi_i(n)$ thus obtained are then decimated by taking one sample out of 2N, which provides couples designated $\rho_i(2Nn)$ and $\phi_i(2Nn)$. Finally, the phase and amplitude information, $\rho(2Nn)$ and $\phi(2Nn)$, from the N subbands is quantized (or re-quantized) using a device labeled "CODE" similar to that shown in FIG. 1. The bank of bandpass filters is the most critical component of the device of FIG. 2.

If the baseband signal from which the samples x(n) are taken is designated x(t) and if the highest frequency of the spectrum of x(t) is designated fs/2, then the signal x(t) will be sampled at its Nyquist frequency, fs, to obtain the samples x(n). The signal x(t) is to be split into subbands providing each two quadrature components whose characteristics are such that they can all be combined to enable the original signal x(t) to be perfectly reconstructed. We shall first assume that the signal x(t) is to be merely split into a couple of signal components in quadrature with each other by means of a complex filter, thereby enabling x(t) to be perfectly reconstructed as necessary. These components will be sampled at the frequency fs/2. A somewhat imperfect definition of these quadrature components may be accepted, provided they allow the reconstructed signal to be a perfect image of the input signal x(t). The complex filter schematically shown in FIG. 3 will be used for this purpose. The input signal x(t) is modulated in M1 by cos ($2\pi fs\, t/4$) and in M2 by sin ($2\pi fs\, t/4$). The output signals from M1 and M2 are then passed through low-pass filters F1 and F2 whose cutoff frequency is fs/4 at $-3$ dB (see FIG. 4). The Z-transfer function of these filters is shown as H(Z). The output signals from the filters, as sampled at fs/2 (e.g. through a decimation operation consisting in dropping every second sample) are designated y(t) and ŷ(t) and represent a couple of decimated series of samples. The Z-transforms, Y(Z) and Ŷ(Z), of y(t) and ŷ(t), respectively, are given by $$Y(Z) = \frac{1}{2} \sum_{l=0}^{1} [X((-1)^l jZ) + X(-(-1)^l jZ)] H((-1)^l Z) \quad (1)$$

and $$\hat{Y}(Z) = \frac{1}{2j} \sum_{l=0}^{1} [X((-1)^l jZ) - X(-(-1)^l jZ)] H((-1)^l Z) \quad (2)$$

where $x(Z)$ is the Z-transform of $x(t)$; and $j = \sqrt{-1}$.

Figure 5:
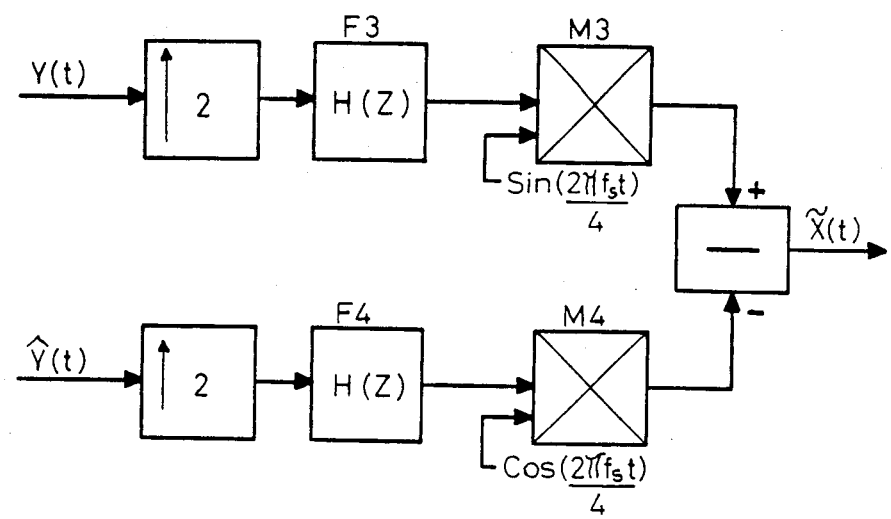
FIG. 5 is a schematic diagram of one of the elements of the device of the present invention.

Referring now to FIG. 5, there is shown a diagram of a device for reconstructing signal x(t) from its components y(t) and ŷ(t). An interpolation process takes place during which a zero-valued sample is added between two consecutive samples of y(t) and ŷ(t), thereby doubling the sampling frequency. The interpolated signals are then passed through filters F3 and F4 whose Z-transfer function is H(Z). The outputs of F3 and F4 are modulated at M3 and M4 by sin ($2\pi fs\, t/4$) and cos ($2\pi fs\, t/4$) respectively. The output of M4 is subtracted from that of M3 to provide x̃(t). The symbol "~" is used here to designate the reconstructed signal x(t).

Let x̃(Z) be the Z-transform of the reconstructed signal x̃(t). We get $$\tilde{x}(Z) = \frac{1}{4j} \sum_{l=0}^{1} [X(-(-1)^l Z) + X((-1)^l Z)] H((-1)^l jZ)\, H(jZ) - \quad (3)$$

$$[X((-1)^l Z) + X(-(-1)^l Z)] H(-(-1)^l jZ)\, H(-jZ) -$$

$$[X(-(-1)^l Z) - X((-1)^l Z)] H((-1)^l jZ)\, H(jZ) -$$

$$[X((-1)^l Z) - X(-(-1)^l Z)] H(-(-1)^l jZ)\, H(-jZ)$$

$$\tilde{X}(Z) = \frac{1}{2j} \sum_{l=0}^{1} X((-1)^l Z) \cdot H((-1)^l jZ) \cdot H(jZ) - X((-1)^l Z) \cdot \quad (4)$$

$$H(-(-1)^l jZ) \cdot H(-jZ)$$

$$\tilde{X}(Z) = \frac{X(Z)}{2j} [H^2(jZ) - H^2(-jZ)] \quad (5)$$

Let H be a symmetrical filter of length K, with K even. The Fourier transform $H(e^{j\omega T})$ of H may be written as:

$$H(e^{j\omega T}) = H(\omega) e^{-j(K-1)\pi\omega/\omega_s} \quad (6)$$

Since $\omega_s T = 2\pi$, we have $j = e^{j\omega_s T/4}$, so that $$H(jZ) \rightarrow H\left(\omega + \frac{\omega_s}{4}\right) e^{-j(K-1)\pi\omega/\omega_s} e^{-j(K-1)\pi/4}$$

$$H(-jZ) \rightarrow H\left(\omega - \frac{\omega_s}{4}\right) e^{-j(K-1)\pi\omega/\omega_s} e^{j(K-1)\pi/4}$$

hence $$\tilde{X}(e^{j\omega T}) = X\left(\frac{e^{j\omega T}}{2j}\right) e^{-j(K-1)\omega T} \left[ H^2\left(\omega + \frac{\omega_s}{4}\right) e^{-j(K-1)\pi/2} - H^2\left(\omega - \frac{\omega_s}{4}\right) e^{j(K-1)\pi/2} \right] \quad (7)$$

Since K is even, K−1 is odd. If we assume that K=4k, we get:

$$e^{-j(K-1)\pi/2} = e^{j\pi/2} = j.$$

In this case, we get $$\tilde{X}(e^{j\omega T}) = \frac{X(e^{j\omega T})}{2} e^{-j(K-1)\omega T} \left[ H^2\left(\omega + \frac{\omega_s}{4}\right) + H^2\left(\omega - \frac{\omega_s}{4}\right) \right] \quad (8)$$

For $K=4k+2$, we have $e^{-j(K-1)\pi/2} = e^{-j\pi/2} = -j$ in which case $$\tilde{X}(e^{j\omega T}) = -\frac{X(e^{-j\omega T})}{2} e^{-j(K-1)\omega T} \left[ H^2\left(\omega + \frac{\omega_s}{4}\right) + H^2\left(\omega - \frac{\omega_s}{4}\right) \right] \quad (9)$$

If we assume that $$H^2\left(\omega + \frac{\omega_s}{4}\right) + H^2\left(\omega - \frac{\omega_s}{4}\right) = 1 \quad (10)$$

then, for $K=4k$, we get $$\tilde{X}(e^{j\omega T}) = \frac{X(e^{j\omega T})}{2} e^{-j(K-1)\omega T} \quad (11)$$

and for $K=4k+2$:

$$\tilde{X}(e^{j\omega T}) = -\frac{X(e^{j\omega T})}{2} e^{-j(K-1)\omega T} \quad (12)$$

Figure 6:
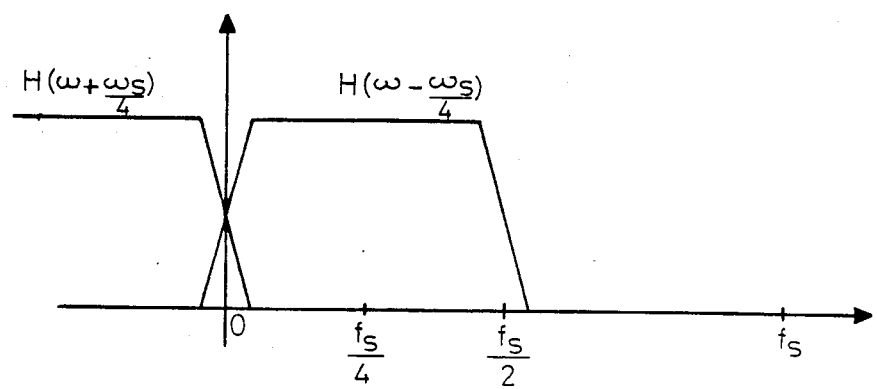

This shows that, provided that condition (10) is satisfied, the original signal can be perfectly reconstructed from its components, with a delay equal to (K−1) samples and a multiplicative coefficient of ±½. Condition (10) means, in particular, that the amplitude of the low-pass filter H at frequency fs/4 must be −3 dB (see FIG. 4). FIG. 6 shows the characteristics of the components y(t) and ŷ(t) of signal x(t) in the frequency domain (see FIG. 3).

Figure 3:
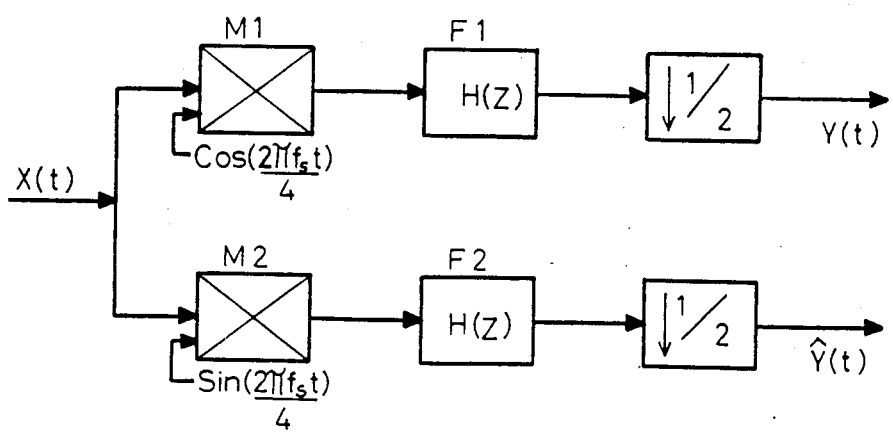
FIG. 3 is a schematic diagram of one of the elements of the device of the present invention.
Figure 4:
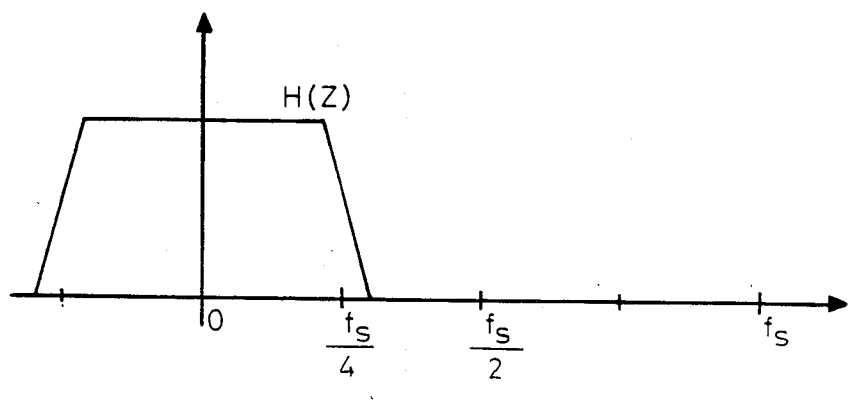
FIGS. 4 and 6 show the frequency spectra of filters used in the present invention.
Figure 7:
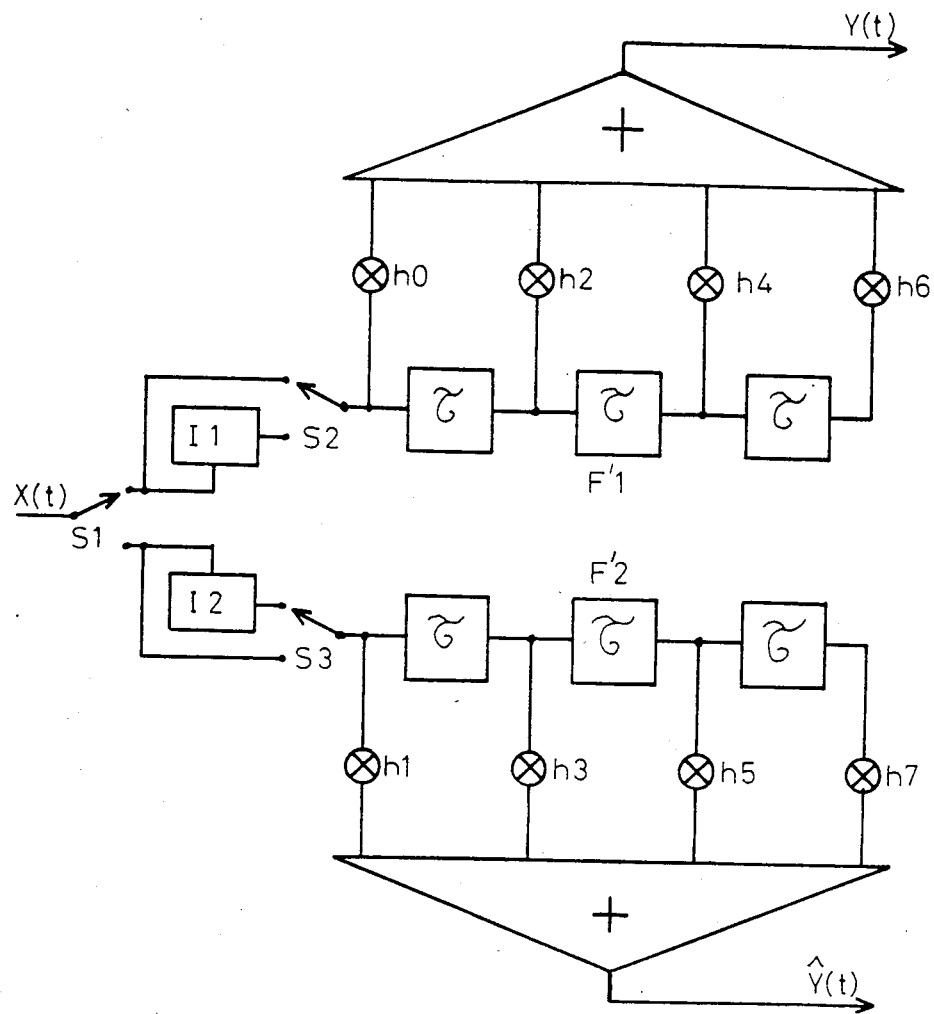
FIGS. 7 and 8 show details of filters used in the present invention.

In practice, the multiplications by cos (2πfs t/4) and sin (2πfs t/4) of the sampled signal are equivalent to cyclic multiplications of the samples by sequences (1, 0, −1, 0) and (0, 1, 0, −1), respectively. Also, as shown in FIG. 3, the signals at the output of filters F1 and F2 are decimated by down-sampling them at frequency fs/2, thereby providing a couple of decimated series of samples. Thus, filters F1 and F2 can be implemented by means of two digital filters operating at fs/2 instead of fs and comprising K/2 taps instead of K. FIG. 7 shows an embodiment of the device of FIG. 3 exhibiting the desired characteristics. The signal x(t) (or the samples x(n) thereof) is fed to a switch S1 connected to switching circuits that include inverters I1 and I2 and switches S2 and S3. The outputs of S2 and S3 are respectively connected to digital filters F1' and F2' that respectively provide the signal components y(t) and ŷ(t) in quadrature with each other. Coefficients h0, h1, h2, h3, h4, h5, etc, are defined for the original filter whose transfer function is H (this is the low-pass filter mentioned earlier whose cutoff frequency is fs/4 at −3 dB).

Figure 8:
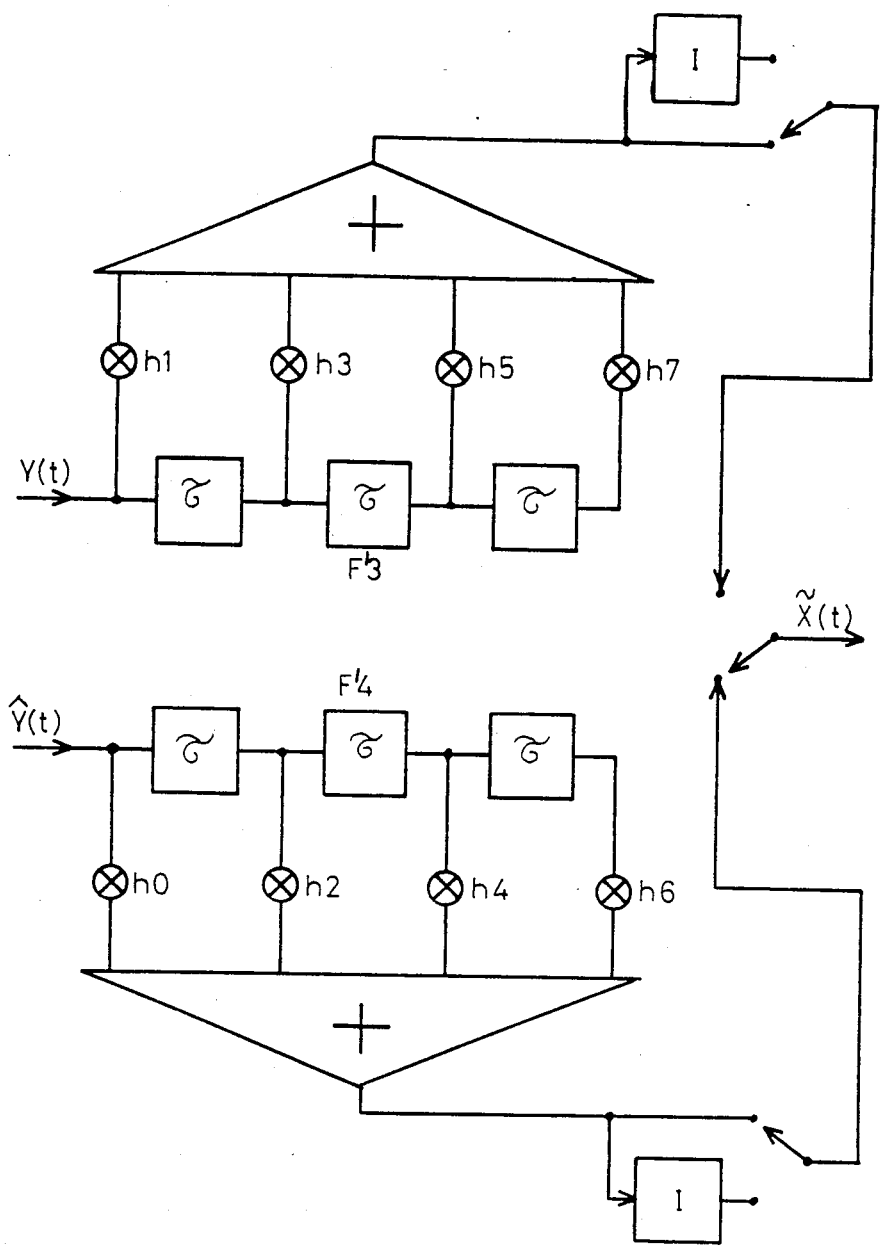

Similarly, the device diagrammatically shown in FIG. 5 that allows the original signal to be reconstructed can be implemented in accordance with the diagram of FIG. 8, as explained below.

Two transversal filters F3' and F4' of length K/2 operating at frequency fs/2 receive the signal components y(t) and ŷ(t), respectively. Inverters I at the output of the filters perform the sine and cosine functions defined earlier. The coefficients h0, h1, h2, etc., are the same as above.

Figure 2:
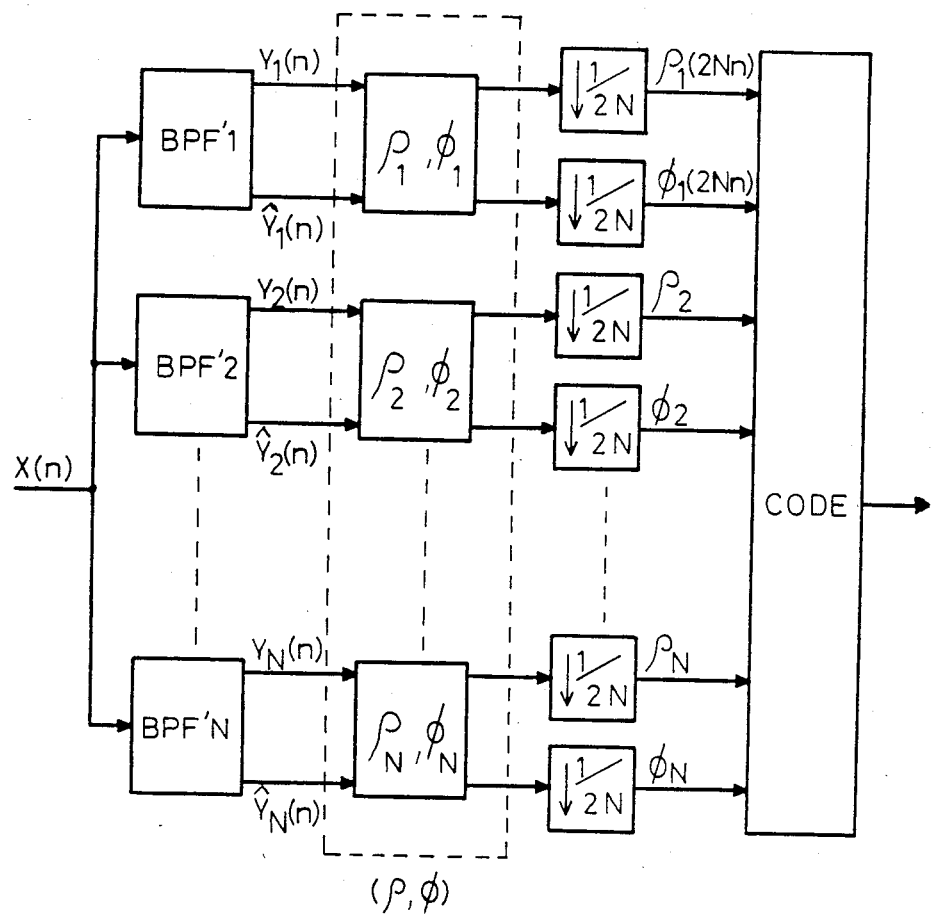
FIG. 2 is a schematic diagram of the coder of the present invention.
Figure 9:
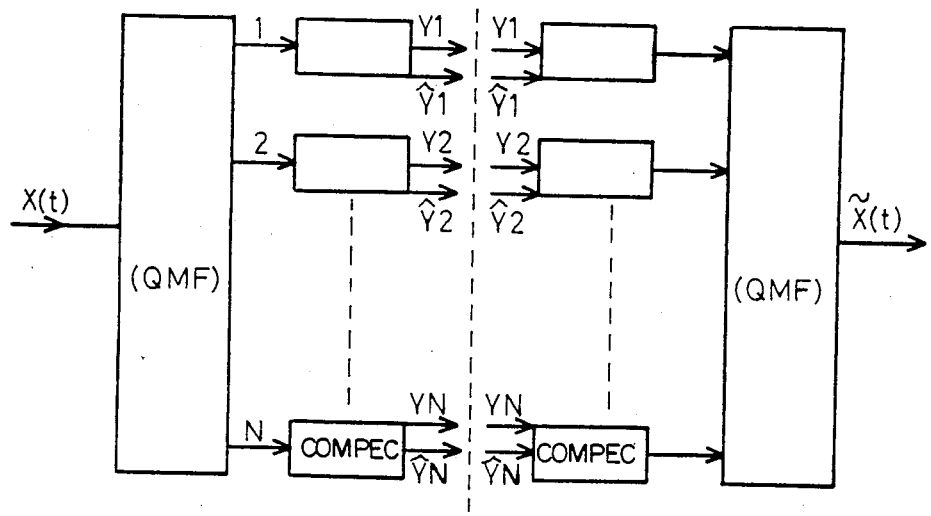
FIGS. 9 and 10 show embodiments of filters intended for the coder of the present invention.

In practice, as shown in FIG. 2, the subband voice coder includes a number N of subbands each of which provides a couple of signal components in quadrature with each other. Any number N of subbands can be obtained by combining the above complex filtering techniques with those described in an article in the IBM Technical Disclosure Bulletin, Vol. 19, No. 9, February 1977, pages 3438-3439, and in the aforementioned U.S. Pat. No. 4,142,071. The complex filtering technique that provides two signal components in quadrature with each other, as described above (FIGS. 7 and 8), and the splitting of the baseband into several subbands using the QMF techniques described in the article and in the U.S. Patent just mentioned can be combined in accordance with either of the diagrams shown in FIGS. 9 and 10. As illustrated in FIG. 9, the subband coding process involves first splitting the baseband into N narrow subbands, using QMF techniques, and then splitting the signal provided by each subband into a couple of signal components in quadrature with each other by means of a filtering device (labeled "COMPLEX") which may be implemented, for example, in accordance with FIG. 7. The decoding process consists in reconstituting the contents of the subbands by combining the signal components in quadrature with each other within each couple, and in then reconstructing the original signal by combining the subbands through the use of QMF techniques.

Figure 10:
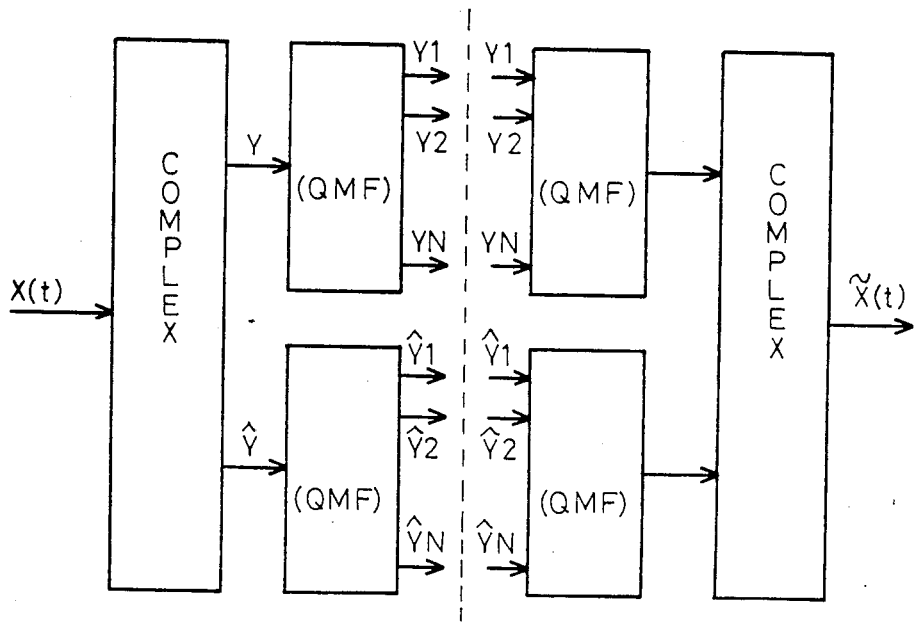

In FIG. 10, the splitting of the baseband into subbands by means of QMF techniques takes place after (not before, as in FIG. 9) the splitting of each subband's signal into quadrature components. However, the basic principles remain the same, whether the arrangement of FIG. 9 or that of FIG. 10 is used; in FIG. 9, the signal components $Y_i$ and $\hat{Y}_i$ (with i=1,2, ..., N) of any couple are obtained in parallel at the output of a "COMPLEX" device, whereas in the arrangement shown in FIG. 10 the in-phase components ($Y_i$) are provided by one QMF and the quadrature components ($\hat{Y}_i$) by another QMF.

Figure 11:
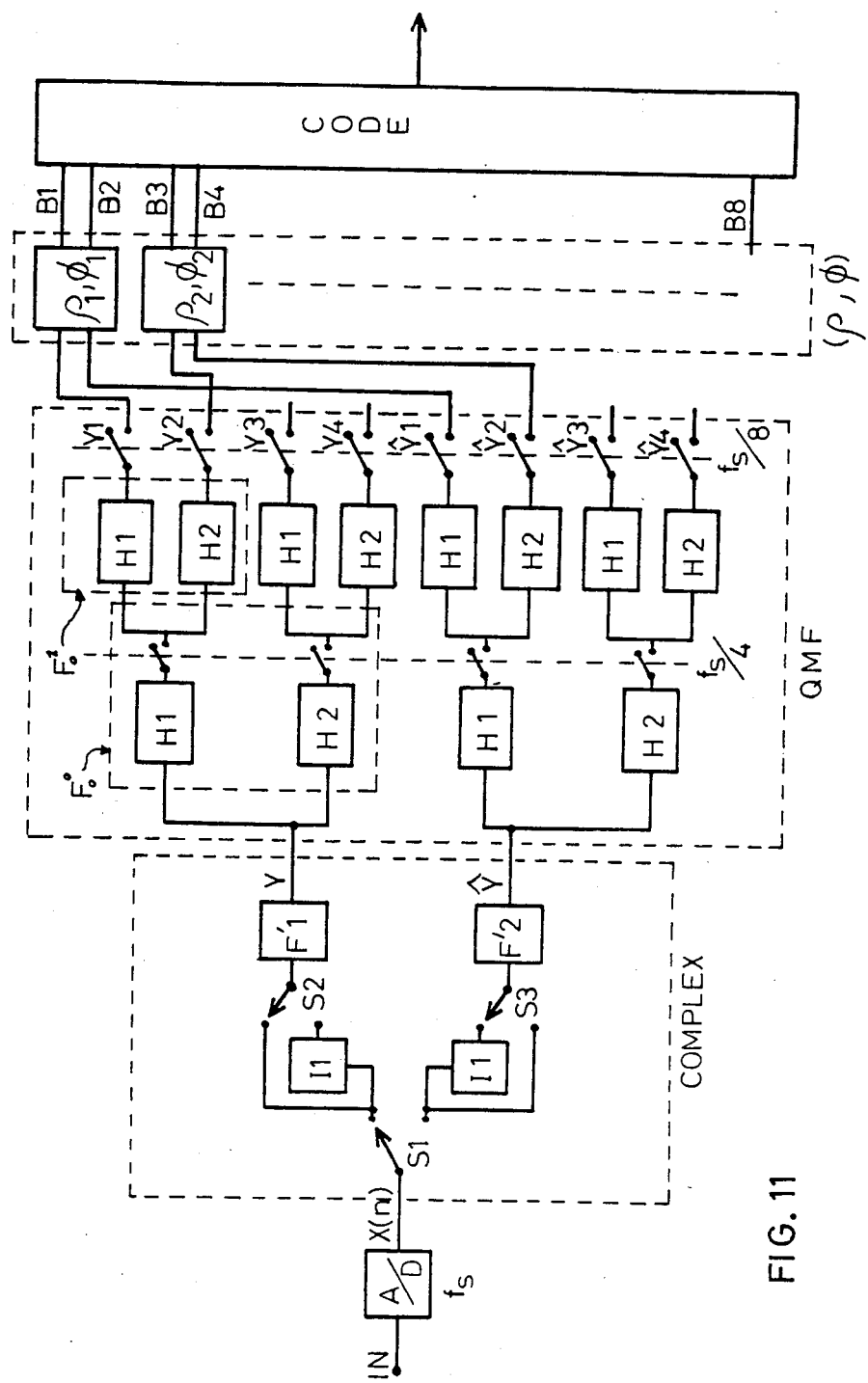
FIGS. 11 and 12 show embodiments of the coder of the present invention.

The QMF techniques used to split the baseband into subbands (as well as those used to reconstruct the signal from the contents of the subbands) are described in the aforementioned U.S. Pat. No. 4,142,071 and in relation to FIG. 4 thereof, which patent is incorporated herein by reference together with the above-mentioned TDB article. However, in order that the manner in which the QMF and complex filtering techniques are combined herein may be more readily understood, reference will now be made to FIG. 11 illustrating an exemplary embodiment of the coder of the present invention (see FIG. 2) and depicting in greater detail the filtering device of FIG. 10. The voice signal to be coded is fed to an analog-to-digital (A/D) converter in which it is sampled at the frequency fs and coded in PCM with 12 bits (which is a relatively high bit rate), for example, to provide the samples x(n). The signal is then fed to a complex filter such as that shown in FIG. 7, which provides signal components y and ŷ in quadrature with each other. These are respectively fed at a frequency fs/2 to a tree structure of the QMF type. More specifically, each of the outputs of the complex filter is fed to a bank of QMF filters that has a tree structure and provides the subbands. Banks of QMF filters that process signals y and ŷ in two stages are shown in FIG. 11. Each of these stages comprises elements designated $F_o{}^0$ or $F_o{}^1$ which themselves comprise two quadrature half-band filters (H1 and H2) and decimation switches which halve the sampling rate. As a result, the overall amount of information for the 2N channels at the output of the filter labeled "QMF" remains the same as that provided by the A/D converter. It should be noted that, in actual practice, the ultimate number of subbands provided by the bank of QMF filters should preferably exceed that shown in FIG. 11. This could be done through the simple expedient of increasing the number of stages of the filter labeled "QMF". Once the splitting into subbands has been completed, each couple of signal components in quadrature with each other is applied to the device labeled "($\rho$, $\phi$)" which generates the phase and amplitude information referred to above:

$$p_i = \sqrt{y_i^2 + y_i^2} \text{ and } \phi_i = \text{Arc tan} \frac{y_i}{y_i}.$$

Eight signals coded in PCM with 12 bits are available at the output of the latter device and are applied to a code converter or transcoder labeled "CODE". This device recodes the signals applied to its eight inputs by means of a requantizing process with dynamic allocation of the available bit resources. This transcoder can be implemented in accordance with the techniques described in the aforementioned U.S. Pat. No. 4,142,071. More precisely, the filtering and phase-amplitude determining components comprising the devices labeled "COMPLEX", "QMF" and "($\rho$, $\phi$)" replace the bank of filters labeled "FB" in said U.S. Patent. The signals obtained at the output of the device laveled "($\rho$, $\phi$)" are therefore transcoded in the device labeled "CODE" in the same manner as the output signals from the p subbands designated B1, B2, . . . , Bp in the latter U.S. Patent (see in particular FIGS. 1 and 3 thereof).

Figure 12:
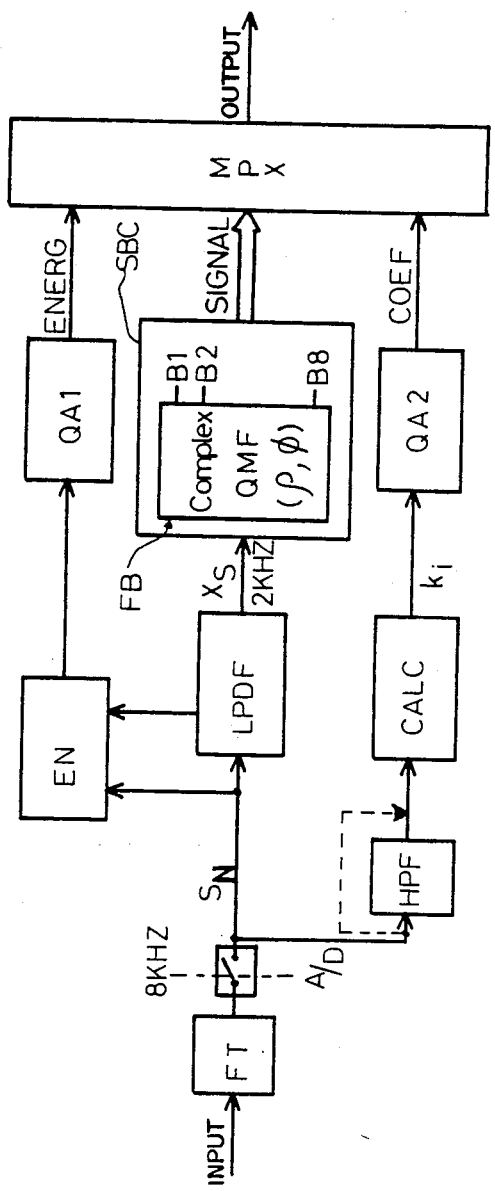

It will be apparent that other code conversion methods can be used for transcoding the signals from the N subbands that are obtained at the output of the device labeled "($\rho$, $\phi$)". Reference may be made in this respect to the coder described in the aforementioned U.S. Pat. No. 4,216,354. For clarity, the coder shown in FIG. 1 thereof has been illustrated in FIG. 12. As shown, the assembly comprised of the devices labeled "COMPLEX", "QMF" and "($\rho$, $\phi$)" has been substituted for the bank of filters labeled "FB" in FIG. 3 of said patent, reference to which should be made for a description of FIG. 12.

While the invention has been particularly shown and described with reference to a preferred embodiment thereof, it will be understood by those skilled in the art that numerous changes in form and detail may be made therein without departing from the spirit and scope of the invention.

What is claimed is:

1. A coding device for coding a low frequency band limited portion of a voice signal, said coding device including:
   sampling means for sampling the band limited voice signal fed thereto at its Nyquist frequency (fs) to generate a decimated series of samples;
   complex filtering means connected to said sampling means for deriving therefrom for each sample of said decimated series of samples a couple of signal components in quadrature with each other, said complex filtering means comprising:
   first and second modulation means alternatively connected to said sampling means for multiplying said couple of signal components by the cyclic sequence (1, 0, −1, 0) and (0, 1, 0, −1), respectively, and
   low-pass filter means connected to said modulation means, said low-pass filtering means deriving therefrom said couple of signal components in quadrature with each other;
   filtering means connected to said complex filtering means for splitting the frequency spectrum of said couple of signal components in quadrature with each other into a given number of subbands through the use of Quadrature Mirror Filter techniques;
   phase-amplitude means connected to said filtering means to derive from the contents of each of said subbands a phase information and an amplitude information;
   and coding means connected to said phase-amplitude means for coding said phase information and said amplitude information within each of said subbands.

* * * * *